US012576950B2

(12) United States Patent
Van Der Schuit

(10) Patent No.: US 12,576,950 B2
(45) Date of Patent: Mar. 17, 2026

(54) FACTORY FOR PRODUCING AN ELONGATED TENSION MEMBER, AND METHOD FOR CONSTRUCTING SUCH A FACTORY

(71) Applicant: Cabin Air Group B.V., Joure (NL)

(72) Inventor: Rinze Jan Van Der Schuit, Oranjewoud (NL)

(73) Assignee: Cabin Air Group B.V., Joure (NL)

( * ) Notice: Subject to any disclaimer, the term of this patent is extended or adjusted under 35 U.S.C. 154(b) by 0 days.

(21) Appl. No.: 18/790,137

(22) Filed: Jul. 31, 2024

(65) Prior Publication Data

US 2025/0153816 A1     May 15, 2025

(30) Foreign Application Priority Data

Nov. 14, 2023    (NL) ...................................... 2036267

(51) Int. Cl.
| | |
|---|---|
| *B63B 35/44* | (2006.01) |
| *B63B 83/20* | (2020.01) |
| *D07B 3/00* | (2006.01) |
| *D07B 5/00* | (2006.01) |

(Continued)

(52) U.S. Cl.
CPC .............. *B63B 35/44* (2013.01); *B63B 83/20* (2020.01); *D07B 3/00* (2013.01); *D07B 5/00* (2013.01); *D07B 7/021* (2021.01); *B63B 2035/4453* (2013.01); *B63B 2035/446* (2013.01); *B63B 2035/4473* (2013.01);

(Continued)

(58) Field of Classification Search
None
See application file for complete search history.

(56) References Cited

U.S. PATENT DOCUMENTS

| | | | | |
|---|---|---|---|---|
| 991,780 A | * | 5/1911 | Holm | ........................ B63B 5/16 |
| | | | | 52/250 |
| 3,962,981 A | | 6/1976 | O'Kon | |

(Continued)

FOREIGN PATENT DOCUMENTS

| | | |
|---|---|---|
| JP | 2013151169 A | 8/2013 |
| JP | 2015115987 A | 6/2015 |

(Continued)

OTHER PUBLICATIONS

PCT International Search Report and Written Opinion for PCT/NL2024/050615, dated Jan. 7, 2025.

*Primary Examiner* — Grace Huang
(74) *Attorney, Agent, or Firm* — Rogowski Law LLC

(57) ABSTRACT

A factory for producing an elongated tension member has a buoyant body, which may be a ship with a hull and an upper deck, arranged to support at least one apparatus for producing the elongated tension member. The at least one apparatus for producing the elongated tension member has a feeder, a processing device and at least one end fitting device. The feeder is arranged to provide input material, such as at least one load bearing yarn and/or at least one load bearing wire and/or load bearing fibres (fibers). The processing device is arranged to wind and/or twist and/or bundle the input material provided by the feeder. The at least one end fitting device is arranged to provide the elongated tension member with a proximal end fitting and a distal end fitting.

17 Claims, 6 Drawing Sheets

(51) Int. Cl.
    *D07B 7/02*         (2006.01)
    *F24S 20/70*       (2018.01)

(52) U.S. Cl.
    CPC .... *D07B 2207/409* (2013.01); *D07B 2501/40* (2013.01); *F24S 20/70* (2018.05)

(56)                References Cited

U.S. PATENT DOCUMENTS

| | | | | |
|---|---|---|---|---|
| 4,003,473 | A * | 1/1977 | Ryan | E02B 3/24 |
| | | | | 114/230.14 |
| 4,659,253 | A | 4/1987 | Jacobsen | |
| 6,155,193 | A * | 12/2000 | Syvertsen | B67D 9/00 |
| | | | | 441/5 |
| 9,182,054 | B2 * | 11/2015 | Haugen | B63B 35/03 |
| 9,457,873 | B2 * | 10/2016 | Nagurny | B63B 35/44 |
| 10,655,275 | B2 * | 5/2020 | Van Der Schuit ... | B65H 59/385 |
| 10,753,040 | B2 * | 8/2020 | Van Der Schuit ..... | D07B 1/145 |
| 11,111,114 | B2 * | 9/2021 | Van Der Schuit ...... | B66C 23/42 |
| 11,939,032 | B2 * | 3/2024 | Boo | B63B 1/107 |
| 12,202,574 | B2 * | 1/2025 | Wang | B63B 1/107 |
| 2002/0176747 | A1 | 11/2002 | Hanna et al. | |
| 2007/0138021 | A1 * | 6/2007 | Nicholson | F03D 9/32 |
| | | | | 205/628 |
| 2007/0258772 | A1 | 11/2007 | Bursaux et al. | |
| 2011/0101697 | A1 * | 5/2011 | Power, III | B63B 35/44 |
| | | | | 290/54 |
| 2022/0281568 | A1 * | 9/2022 | Trojer | G21C 13/02 |
| 2023/0399206 | A1 * | 12/2023 | Wijning | B66C 23/52 |
| 2025/0108892 | A1 * | 4/2025 | Kravitz | B63B 35/44 |

FOREIGN PATENT DOCUMENTS

| | | | | |
|---|---|---|---|---|
| NO | 344880 | B1 | 12/2019 | |
| WO | 2017099589 | A1 | 6/2017 | |
| WO | WO-2018166939 | A1 * | 9/2018 | B63B 35/44 |
| WO | WO-2020005074 | A1 * | 1/2020 | |
| WO | WO-2022231511 | A1 * | 11/2022 | B63B 1/107 |
| WO | WO-2024069076 | A1 * | 4/2024 | B63B 27/12 |

\* cited by examiner

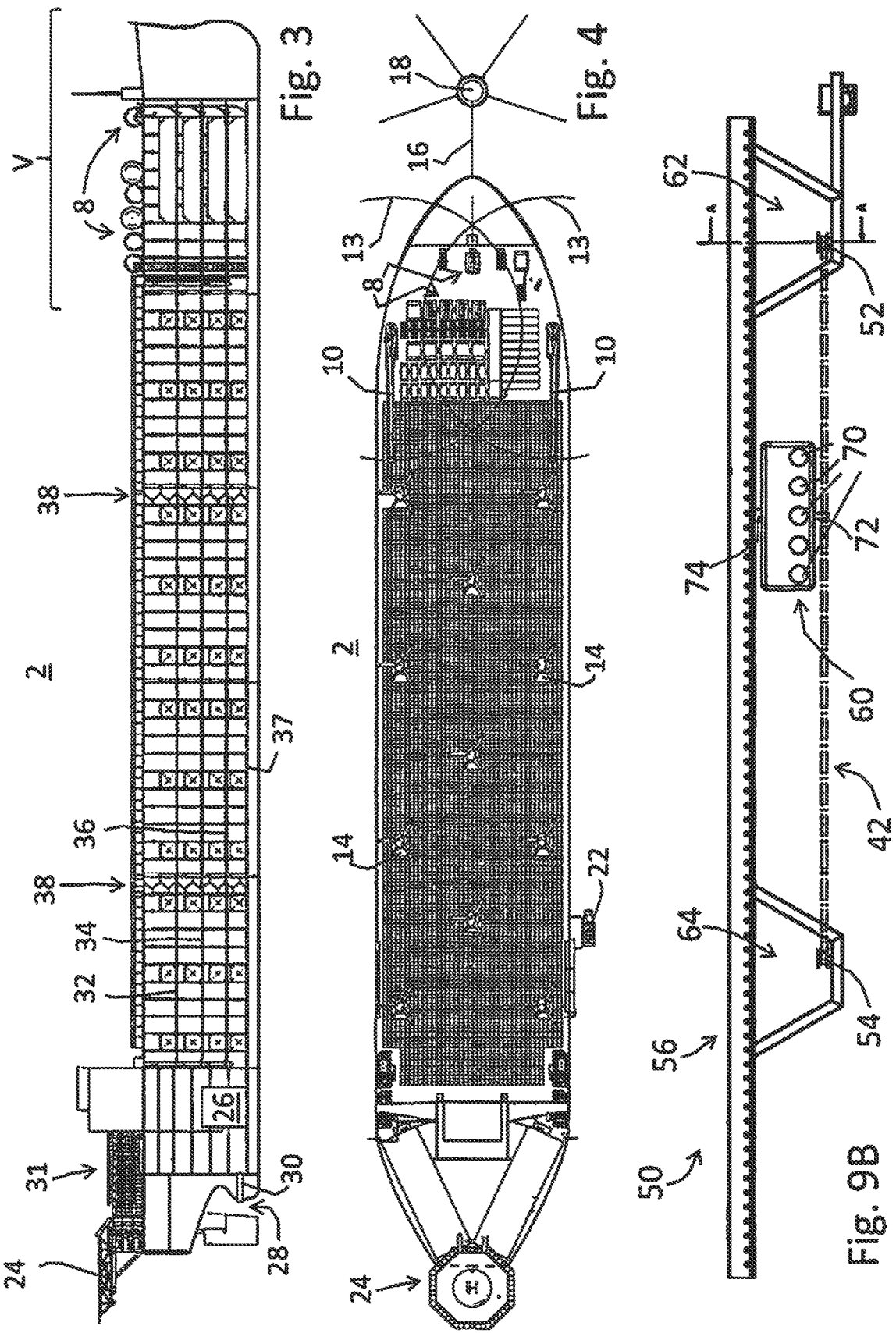

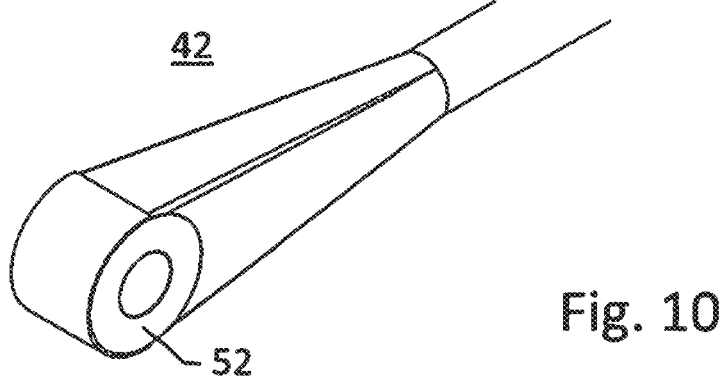
Fig. 10
Fig. 11
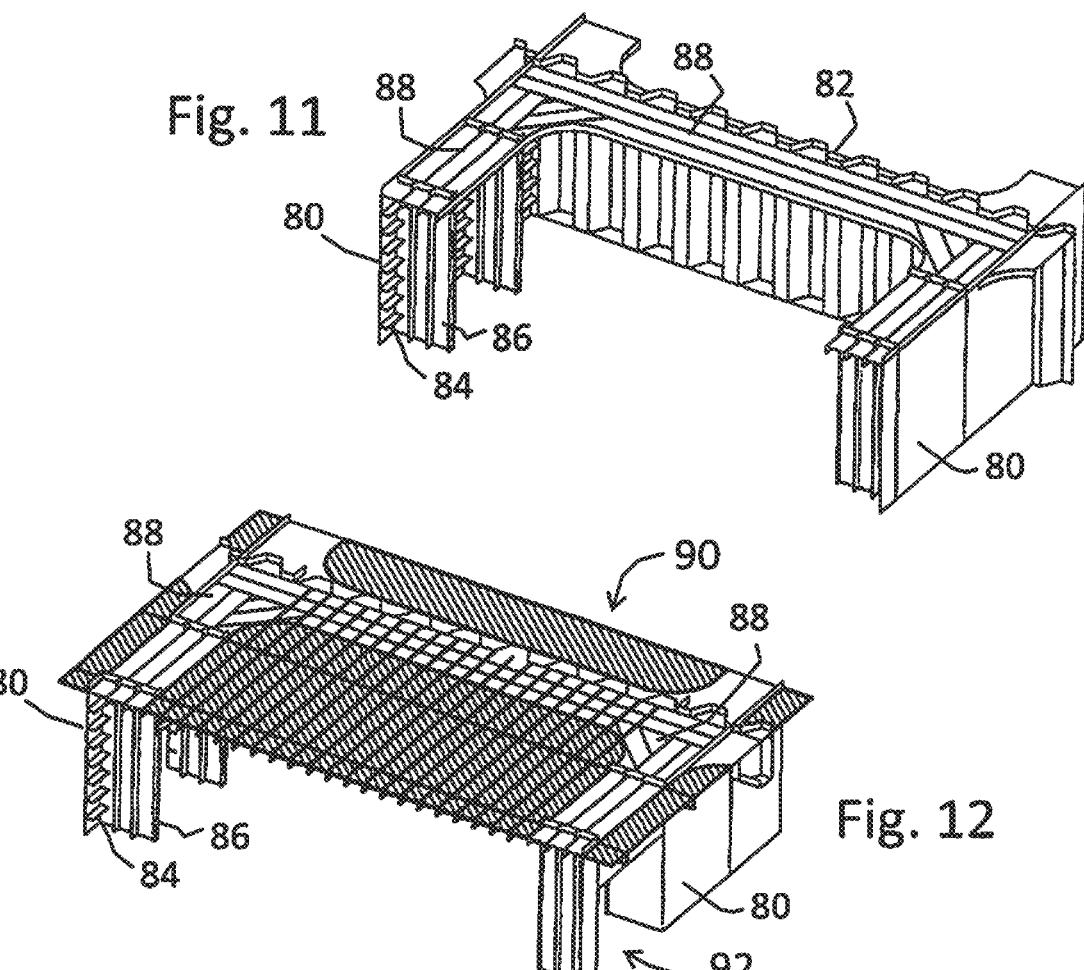
Fig. 12

FACTORY FOR PRODUCING AN ELONGATED TENSION MEMBER, AND METHOD FOR CONSTRUCTING SUCH A FACTORY

CROSS-REFERENCE TO RELATED APPLICATION

This application claims benefit under 35 USC § 119 of NL 2036267, filed Nov. 14, 2023, the contents of which are incorporated by reference herein.

BACKGROUND OF THE INVENTION

The invention relates to a factory for producing an elongated tension member and to a method for constructing such a factory.

Elongated tension members are used for bearing a load, in particular a tensile load. Elongated tension members can be used in different types of industry, including but not limited to offshore, mining and heavy lifting and construction. In offshore, such a tension member may be used as a mooring line for ships and structures like a floating oil exploration or production facility, or a floating wind turbine. A further example of a floating structure is a tension leg platform, wherein elongated tension members are used as the tension legs. In mining and heavy lifting an elongated tension member may be used as a pendant for a crane. In construction, elongated tension members may be used in a bridge or a roof.

A device for producing an elongated tension member is known from WO-A1-2017/099589. This document discloses producing a tension member by positioning two thimbles at a predetermined distance from each other and winding at least one yarn around the thimbles until a predetermined number of layers of yarn turns is provided at both thimbles.

The length of elongated tension members typically is more than 100 meters, even up to or exceeding 250 meters. The substantial length of the tension members makes transport to the deployment site, such as an offshore wind farm, a complex and costly operation. There is thus a need for locally producing the tension members. However, this requires construction of factories. For example, it is common that factories for wind turbine components are deployed at coastal areas near the future wind farm. This requires a significant use of land, which may not always be available. Moreover, once the construction of the wind farm is completed, the factories are no longer used. This is a waste of land use. On some occasions, authorities require deconstruction of the factories after completion of the construction, which incurs significant costs.

The invention aims to solve these problems, or at least to provide an alternative. In particular, the invention aims to provide a factory for locally producing elongated tension members that avoids wasteful land use and/or costs of mandatory deconstruction or demolition of factories.

SUMMARY OF THE INVENTION

The factory comprises at least one apparatus for producing an elongated tension member. The at least one apparatus comprises: a feeder, a processing device and at least one end fitting device. The feeder is arranged to provide input material. The input material comprises: at least one load bearing yarn and/or at least one load bearing wire and/or load bearing fibres (fibers). The processing device is arranged to wind and/or twist and/or bundle the input material provided by the feeder. The at least one end fitting device is arranged to provide the elongated tension member with a proximal end fitting and a distal end fitting. The factory further comprises a buoyant body arranged to support said at least one apparatus for producing the elongated tension member.

The factory according to the invention enables local production of elongated tension members. The buoyant body enables transport of the factory over water, to produce elongated tension members near a construction site, e.g. an offshore wind farm, without the need for a local land-based building site. The buoyant body for example comprises a ship, vessel or floating platform. The factory may include means for propulsion, such as an engine and/or a propeller, but preferably the factory is unmotorized, i.e. without an engine and/or propeller, in which case the factory can be transported by towing. After the construction at the construction site is completed, the factory can be relocated to a different deployment site.

Elongated tension members may also be referred to as cables or tendons.

The input material for example comprises metal and/or a synthetic material and/or fibres (fibers), such as carbon fibres (fibers), basalt fibres (fibers), polyamide fibres (fibers), polyester fibres (fibers), polypropylene fibres (fibers), polyethylene fibres (fibers), aramid fibres (fibers), para-aramid fibres (fibers), HMPE fibres (fibers), LCAP fibres (fibers) or PBO fibres (fibers).

In an embodiment, the input material comprises at least one yarn. The processing device is arranged to wind the at least one yarn around two thimbles that are provided at opposite ends of the elongated tension member from a first one of the two thimbles to a second one of the two thimbles, back to the first one of the two thimbles, which winding is repeated until sufficient windings extend between the two thimbles. The proximal and distal end fittings of the elongated tension member comprise the two thimbles. The at least one end fitting device comprises a first thimble holder and a second thimble holder that are provided at a distance from one another. Each thimble holder is designed to hold one of the two thimbles.

Within the context of this specification, a yarn is defined as a bundle of untwisted or twisted fibres (fibers) or filaments of one or multiple types. Preferably, the yarn comprises a bundle of untwisted fibers.

In this embodiment, the at least one apparatus produces the elongated tension member by a process referred to as endless winding. Tension members produced by endless winding exhibit a high strength and long life span, as compared to e.g. steel wire rope or a rope made of twisted and/or braided plastic fibres (fibers).

Preferably, the processing device comprises an elongated guide and a carriage, with the feeder being connected to the carriage. The elongated guide and the carriage are movably connected to one another for a movement of the carriage relative to the elongated guide in a length direction of the elongated guide. The feeder comprises at least one spool holder for holding a spool with the at least one yarn, and an output guide for guiding the at least one yarn to the elongated tension member during winding. The output guide and the first thimble holder, as well as the output guide and the second thimble holder, are movable relative to each other in at least a direction perpendicular to the length direction of the elongated guide for guiding the at least one yarn half a turn around respectively the first one of the two thimbles and the second one of the two thimbles during winding.

As an alternative to endless winding, the elongated tension member comprises rope, such as wire rope or plastic rope, and the input material comprises metal wires (such as steel wires) or fibres (fibers) (such as plastic fibres (fibers), basalt fibres (fibers), or carbon fibres (fibers)). In this alternative embodiment, the processing device is arranged to twist or braid the metal wires or fibres (fibers).

In an embodiment, the buoyant body is a ship comprising a hull and an upper deck.

In a further embodiment, the at least one apparatus is arranged within the hull of the ship, below the upper deck. By arranging the at least one apparatus within the hull, the at least one apparatus is protected from salt water which would otherwise cause corrosion of components of the apparatus. Additionally, the hull can be climate controlled, e.g. by a heating, ventilation and air conditioning (HVAC) system, which is beneficial to personnel operating the at least one apparatus.

In a further embodiment, a reel is provided on the upper deck of the ship for winding one or more elongated tension members onto the reel, and the upper deck comprises a hatch for feeding elongated tension members produced by the at least one apparatus within the hull to the reel on the upper deck. Tension members can thus be stored on the upper deck, from which they can be transported to the nearby deployment site. Preferably, the elongated tension members are corrosion resistant, such that they can be stored on the upper deck without being affected by salt water. For example, the input material for the tension members is corrosion resistant (e.g. synthetic fibres (fibers)) and/or the tension members are provided with protective cover (e.g. of a synthetic material).

In an embodiment, the hull of the ship comprises a double hull that is at least partly filled with ballast comprising a solid material and/or fresh water. Conventionally, seawater is used as ballast, which has the drawback of causing corrosion of the hull. The inventor realized that the floating factory of the invention can be permanently ballasted, since the load carried by the ship does not change significantly over time, as compared to e.g. a container ship or oil carrier. Therefore, the ship can be ballasted with fresh water, which is less corrosive than seawater, thereby increasing the lifespan of the factory. In an embodiment, the ship is ballasted with a solid material, and in particular a flowable solid material. The solid material comprises one or more of: sand, concrete, rock. For example, the solid material may comprise gravel or crushed stone/angular rock. An additional advantage of sand is that it has a lower thermal conductivity than water, thus providing insulation to the hull, which reduces energy consumption when the hull is climate controlled.

In an embodiment, the ship is a converted motorized ship, wherein an engine of the motorized ship is removed from an engine room of the ship for repurposing the engine room, preferably as storage room for storing the input material. Preferably, the ship is towed to the desired location.

In an embodiment, the ship is a converted oil tanker, such as a Very Large Crude Carrier (VLCC), the hull of the ship comprising a tank structure, wherein at least one inner deck is mounted in the tank structure to provide multiple production compartments, wherein the at least one apparatus is provided in one of the production compartments. The inventor found that the tank structure of oil tankers is particularly suitable for mounting one or more inner decks, e.g. for creating multiple production floors within the ship.

Particularly, the tank structure typically comprises stringers. In an embodiment, the at least one inner deck is mounted to said stringers. An inner deck mounted to stringers may be referred to as a "stringer deck". Preferably, multiple stringer decks are provided within the hull of the ship.

In an embodiment, at least one inner deck is provided in the buoyant body (e.g. in the hull of the ship). In an example, multiple inner decks are provided. The one or more inner decks are each provided with multiple apparatuses for producing elongated tension members. The multiple apparatuses are arranged in parallel on the respective inner deck to form parallel production lanes. Preferably, the at least one inner deck is further provided with a braiding machine for braiding a protective cover around an elongated tension member. The braiding machine is movable between at least two production lanes. For example, the braiding machine is provided with wheels and/or guiding rails to enable moving the braiding machine between production lanes. Braiding may also be referred to as "weaving", and the braiding machine may also be referred to as "weaving machine".

In an alternative embodiment, multiple inner decks are provided in the buoyant body (e.g. ship) that are each provided with a single apparatus for producing an elongated tension member.

In an embodiment, the buoyant body (e.g. ship) is provided with solar panels and/or wind turbines, preferably vertical axis wind turbines. Preferably, the solar panels and/or wind turbines are provided on an upper surface of the buoyant body (e.g. the upper deck of the ship). Optionally, the buoyant body (e.g. ship) is provided with a battery. Preferably, the factory further comprises a hydrogen production facility and/or hydrogen storage and/or a hydrogen fuel cell. In this manner, the entire factory may be operated using renewable energy. If the factory is equipped with a hydrogen production facility, the hydrogen fuel cell is used to generate electricity for operating the factory.

The invention further relates to a method for constructing a factory for producing an elongated tension member. Such a method provides the same technical effects as described above in relation to the inventive factory. Moreover, the preferred and/or optional features defined above for the device are preferred and/or optional features for the method as well.

The method comprises providing at least one apparatus for producing the elongated tension member. The at least one apparatus comprises a feeder, a processing device and at least one end fitting device. The feeder is arranged to provide input material. The input material comprises at least one load bearing yarn, and/or at least one load bearing wire, and/or load bearing fibres (fibers). The processing device is arranged to wind and/or twist and/or bundle the input material provided by the feeder. The at least one end fitting device arranged to provide the elongated tension member with a proximal end fitting and a distal end fitting. The method further comprises providing a buoyant body, and installing the at least one apparatus in or on the buoyant body.

The method results in a factory with the same or similar technical effects as described above.

In an embodiment, providing the buoyant body comprises converting a ship having a hull and an upper deck, wherein preferably the ship is an oil tanker.

In an embodiment, converting the ship comprises: removing an engine of the ship from an engine room and repurposing the engine room, preferably as storage room for storing the input material.

In an embodiment, converting the ship comprises: filling a double hull of the ship at least partly with ballast material comprising a solid material and/or fresh water, wherein the solid material preferably comprises a flowable solid material, such as at least one of: sand, concrete, rock.

In an embodiment, converting the ship comprises: mounting at least one inner deck in the ship for supporting the at least one apparatus, wherein preferably the at least one inner deck is mounted to stringers of a tank structure of the ship.

DESCRIPTION OF THE DRAWINGS

The invention, its effects and advantages will be explained in more detail on the basis of the schematic drawings, in which:

FIG. 3 is a longitudinal cross-section of the factory of FIG. 1;

FIG. 4 is a top view of the factory of FIG. 1;

FIG. 9B is a schematic side elevational view of the endless winding apparatus of FIG. 9A;

FIG. 10 shows one end of an elongated tension member produced by the endless winding apparatus of FIGS. 9A and 9B;

FIG. 11 shows a part of a tank structure of an oil tanker prior to conversion into a factory, in top view;

FIG. 12 shows the tank structure of FIG. 11 after conversion into a factory according to an embodiment of the invention, in top view;

DETAILED DESCRIPTION

Figures 1, 2:
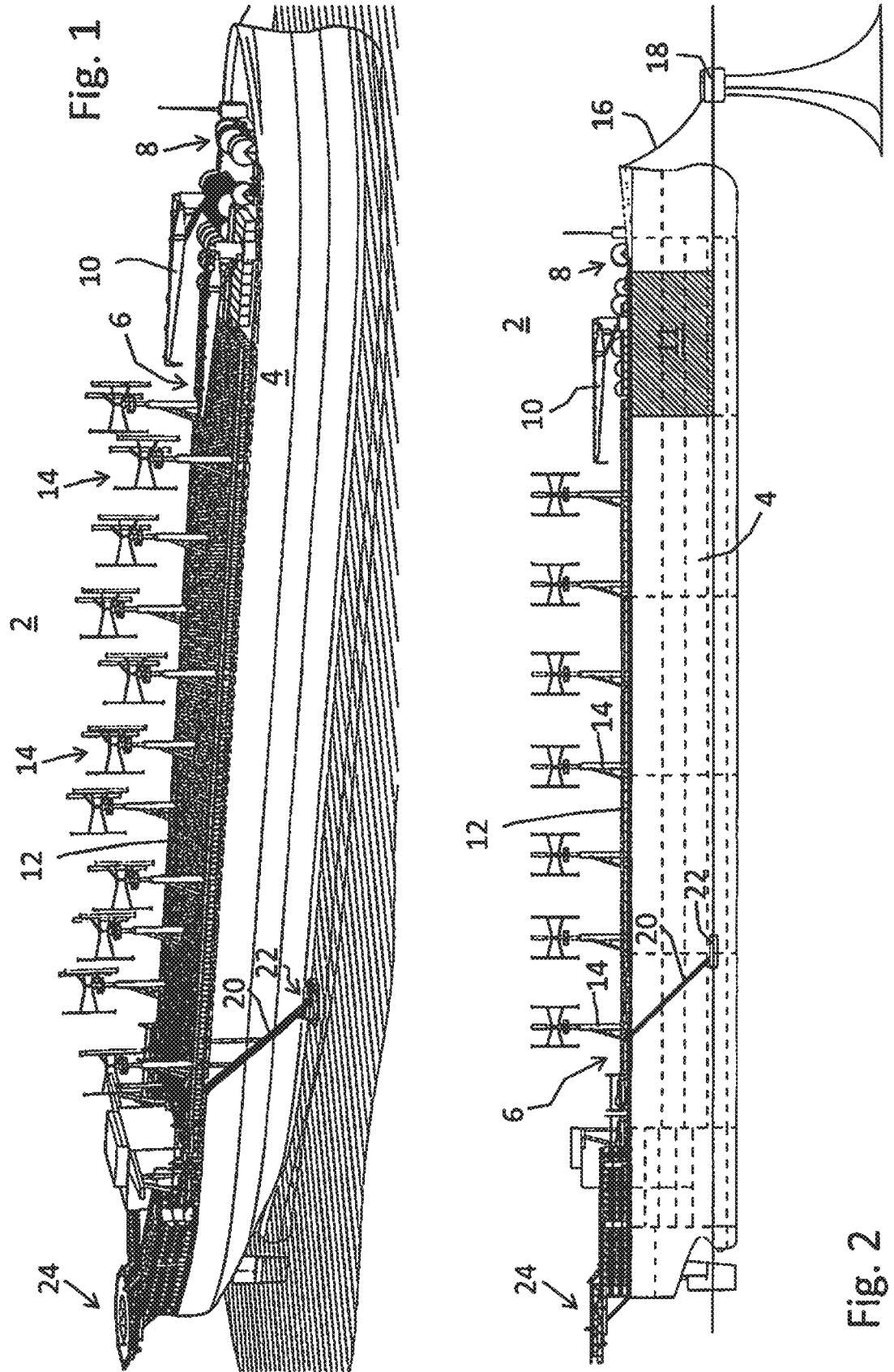
FIG. 1 is a perspective view of a factory according to an embodiment of the invention, comprising a converted oil tanker equipped with an endless winding machine.
FIG. 2 is a side elevational view of the factory of FIG. 1.

The FIGS. 1-4 show a factory according to an embodiment of the invention, comprising a ship, which is denoted in its entirety by reference number 2. In this example, the ship 2 is a converted oil tanker 2, more specifically a converted very large crude carrier (VLCC).

The ship 2 comprises a hull 4 and an upper deck 6. On the upper deck 6, reels 8 are provided for storing elongated tension members produced in the hull 4 of the ship (details set out below). In the example, two cranes 10 are provided on the upper deck 6, for offloading the produced tension members from the ship 2. The reels 8 and cranes 10 are located at a foreship section V (FIG. 3) of the ship 2 and form part of a discharge/loading area 11 of the ship 2. The reach of the cranes 10 is indicated with reference number 13 in FIG. 4. In the example, the cranes 10 can carry 40 tons and have a reach of 40 meters.

In the example, the upper deck 6 is further provided with solar panels 12 and vertical axis wind turbines 14 for producing the electrical energy for operating the ship 2. The ship optionally further comprises a battery (not shown) for storing electrical energy.

The ship 2 is moored via mooring line 16 to a single point mooring system 18.

Personnel can enter the ship 2 via gangway 20 that is connected to boat landing 22. In this example, the ship 2 further comprises an optional helicopter platform 24.

The cross-section of FIG. 3 shows the engine room 26 from which the engine has been removed when converting the oil tanker into a factory for producing elongated tension members. In the example, the engine room 26 is repurposed as a storage room for storing input material for the production of elongated tension members. The propellor of the ship 2, which was located at reference number 28, has also been removed during conversion of the ship 2. This reduces ship resistance when towing the ship 2. Preferably, also the shaft connecting the propellor and engine is removed. In such a case, the stern tube 30 that previously held the shaft of the propellor is sealed off.

In the example of the figures, the funnel for exhaust gases has also been removed from the ship 2 during conversion. The funnel was previously located in the area indicated by reference number 31. The removal of the funnel provides additional space on the upper deck 6. In the example, this additional space is used to accommodate crew cabins.

FIG. 3 further illustrates several inner decks 32, 34, 36 that have been constructed during conversion of the ship 2. In the example, three inner decks 32, 34, 36 are provided. Together with tank top 37 of the ship 2, the inner decks 32, 34, 36 provide four floors within the ship 2. Stairways 38 have been installed to allow personnel to access each of the production floors.

Figures 5, 6, 7:
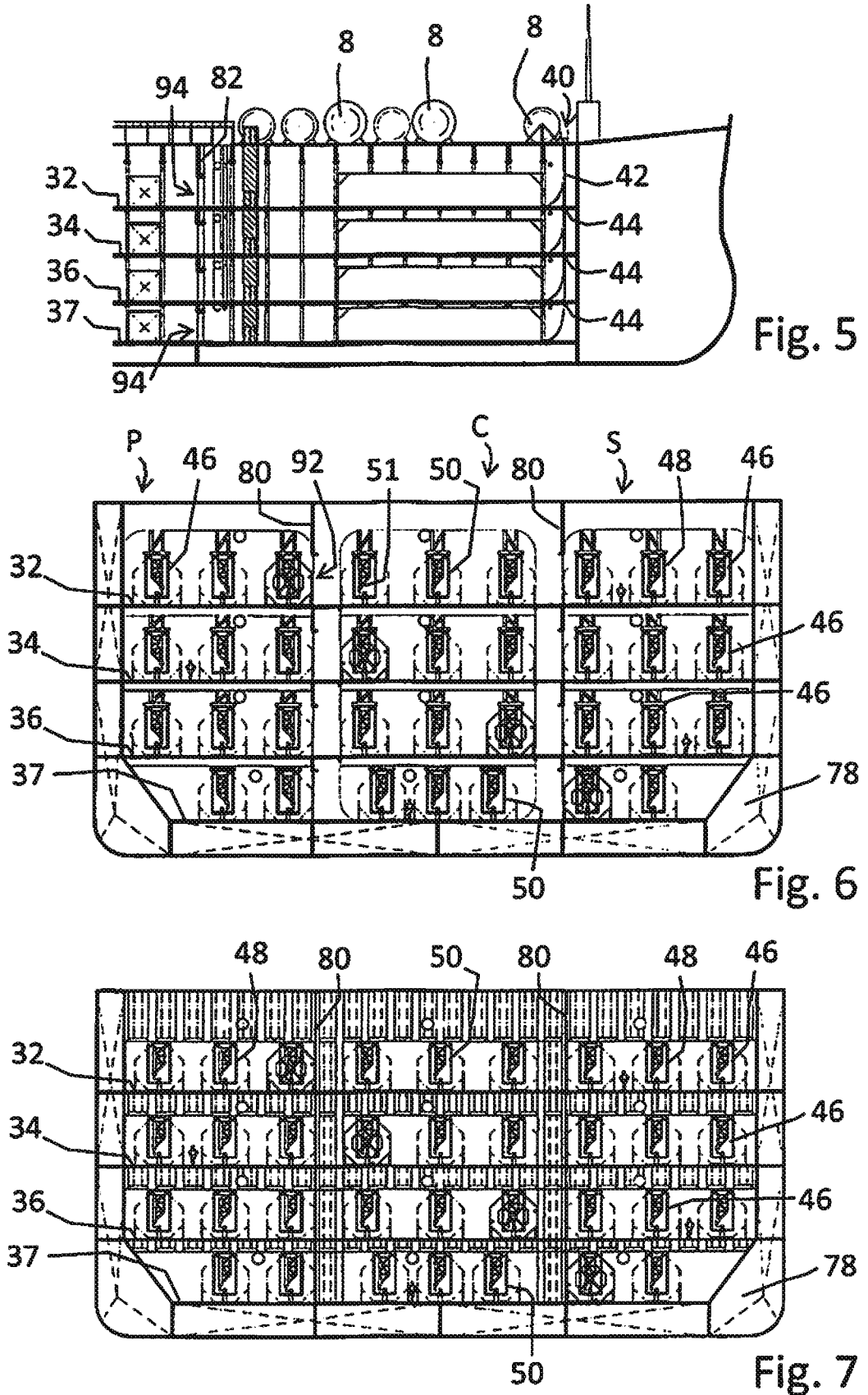
FIG. 5 shows the front part V of FIG. 3 in detail.
FIGS. 6-8 are transverse cross-sections showing the web frame section, corrugated bulkhead section and foreship section, respectively, of the oil tanker of FIG. 1.

The foreship section V (FIG. 3) is shown in detail in FIG. 5. The upper deck 6 is provided with hatches 40 for winding the tension members, produced within the hull 4 of ship 2, onto reels 8. The tension members are indicated with reference number 42. At the foreship section V (FIG. 3), the inner decks 32, 34, 36 are provided with openings 44 for feeding through the produced tension members 42, towards the reels 8 on the upper deck 6. In the example, reels 8 can accommodate up to 1000 meters of tension members, e.g. four tension members of up to 250 meters each. In the example, the diameter of the reels 8 is four meters.

Figure 8:
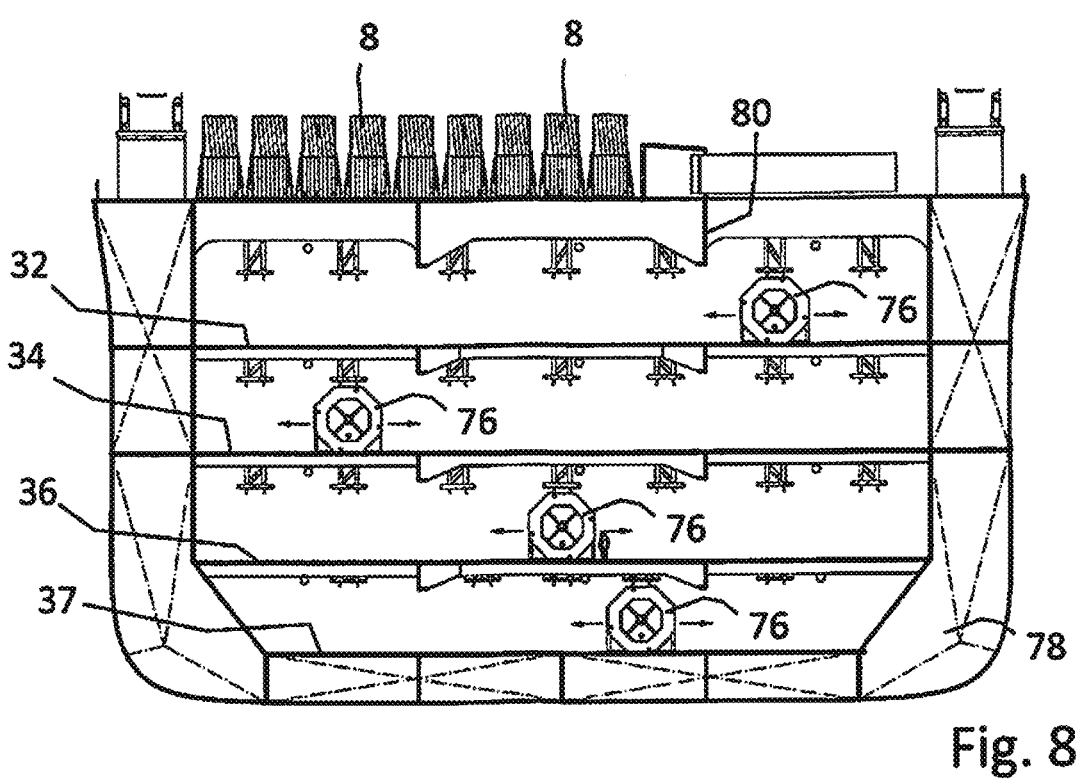

FIG. 6-8 are transverse cross-sections of a back, middle and front portion of the ship 2, respectively. The back, middle and front portion are also referred to as webframe section, corrugated bulkhead section and foreship section V (FIG. 3), respectively. Multiple endless winding apparatuses 46, 48, 50 for producing an elongated tension member are provided on each floor of the ship 2. In the example, a total of 44 endless winding apparatuses are depicted. The apparatuses 46, 48, 50 have different lengths, but are otherwise identical in this embodiment.

Figure 9A:
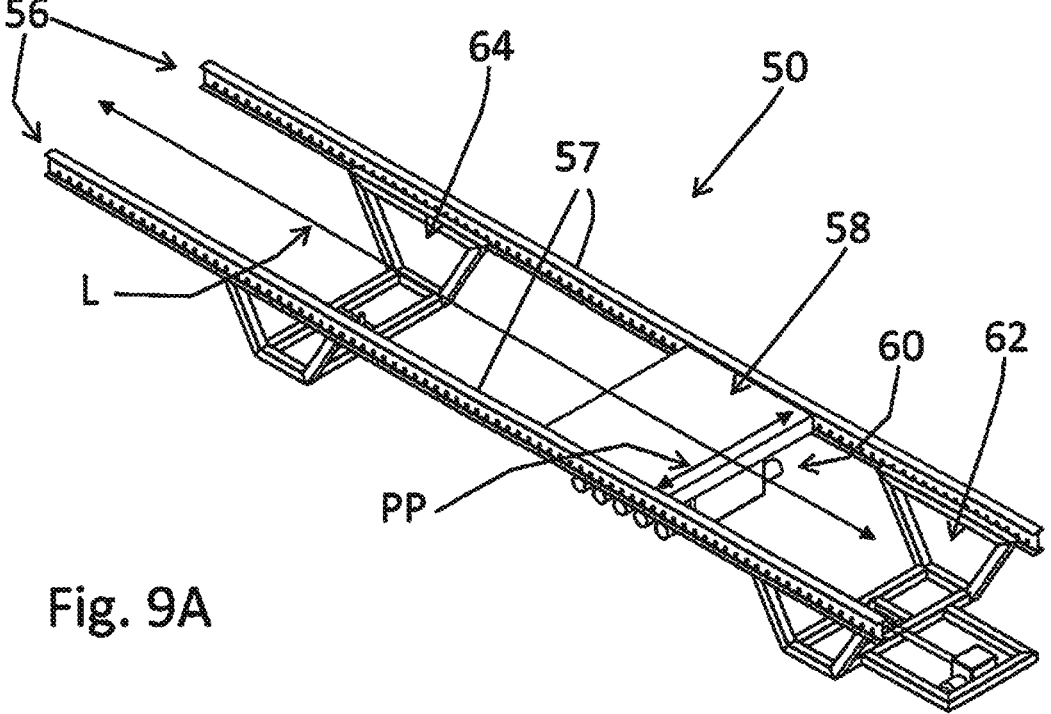
FIG. 9A is a schematic perspective view of an endless winding apparatus for producing an elongated tension member.

An example of the endless winding apparatus 50 is depicted in FIGS. 9A-B. The apparatus corresponds to the endless winding apparatus of WO-A1-2017/099589 described above, the disclosure of which is incorporated by reference herein, although other types of endless winding apparatus can be used according to the invention. The apparatus 50 is designed to produce an endless winding cable 42 (FIG. 9B) by winding at least one yarn, in this embodiment a maximum of ten yarns simultaneously, around two thimbles 52, 54 that are provided at opposite ends of the cable 42. The apparatus 50 comprises an elongated guide 56, a carriage 58 (FIG. 9A), a yarn feeder 60, a first thimble holder 62, and a second thimble holder 64. In this embodiment the elongated guide 56 comprises two elongated I-profiles 57 (FIG. 9A) each having a length designated "L" as shown in FIGS. 9A and 9B. The elongated guide 56 is suspended from a top wall of the respective compartments of the ship 2, e.g. suspended from the lower side of upper deck 6 or the bottom walls of inner decks 32, 34, 36.

The yarn feeder 60 comprises in this embodiment ten spool holders, each designed for holding a spool 70. Each of the ten spools 70 holds a yarn. The yarn feeder 60 further comprises an output guide 72 (FIG. 9B) for guiding all ten yarns to the cable 42 during winding. The output guide 72 of this embodiment comprises rollers for guiding the ten yarns, and is in a fixed position relative to the yarn feeder 60. This fixed position is offset from a middle of the yarn feeder 60.

The yarn feeder 60 is connected to the carriage 58, in this embodiment via a pivot 74, which pivot 74 is positioned at the middle of the yarn feeder 60. This enables the yarn feeder 60 to rotate about a vertical axis with respect to the carriage 58. This rotation results in the output guide 72 moving along an arc, in this case a semi-circle, with respect to the elongated guide 56 and thus relative to the first thimble holder 62 and to the second thimble holder 64. This semi-circle includes a movement in a direction perpendicular (see PP in FIG. 9A) to the length direction (see L in FIG. 9A) of the elongated guide 56, and enables the output guide 72 to guide the yarns half a turn around respectively the first thimble 52 at the first thimble holder 62 and the second thimble 54 at the second thimble holder 64 during winding when the output guide 72 is just beyond the respective one of the two thimbles 52, 54.

The apparatuses 46, 48, 50 extend over a substantial portion of the length of the ship 2. In the example, the apparatuses extend over more than 50% of the length of the ship 2. In the example, the ship 2 is 340 meters long, 60 meters wide and 31 meters deep. The apparatuses 46, 48, 50 have a length between 190 and 250 meters, particularly the elongated guide 56 has a length of 190-250 meters. In the illustrated example, apparatuses 50 in a middle portion of the ship 2 are longer (e.g. 250 meters) than apparatuses 46, 48 in the left and right portion of the ship 2 (e.g. 190-235 meters).

In the example of FIGS. 6 and 7, the apparatuses 46, 48, 50 each comprise a vertically extending framework 51 for positioning the yarn feeder 60 at a height of 1.5-2.5 meters to make it easy to reach by operators. In the example of FIGS. 6 and 7, the yarn feeder 60 is connected to the carriage 58 via the vertically extending framework 51.

The tension members 42 are provided with a protective cover using braiding machines 76 (FIG. 8) located in the foreship section V. In the example, each floor is provided with a single braiding machine 76, that is movable in a lateral direction of the ship 2 (athwartships, i.e. across the ship from side to side). In this manner, a single braiding machine 76 can be used for all the endless winding apparatuses 46, 48, 50 on the same floor. Each endless winding apparatus 46, 48, 50 forms a production lane, and the braiding machine 76 is movable between production lanes. Typically, the process of braiding takes less time than the process of endless winding, such that using a single braiding machine for more than one endless winding apparatus does not increase production time. For example, the braiding machines 76 are provided with guide rails and/or wheels for enabling movement between the production lanes. Optionally, the braiding machine is also movable in the longitudinal direction of the ship.

FIG. 10 shows one end of an example of an elongated tension member, in this embodiment an endless winding cable 42 with a thimble 52 produced by one of the endless winding apparatuses 46, 48, 50 and braiding machine 76.

Referring again to the cross-section of FIGS. 6-8, the ship 2 comprises a double hull (also referred to as double walled hull). The double hull provides, between its two walls, a space 78 for ballast material. In the example, the ballast comprises sand.

As illustrated in FIGS. 6-8, the ship 2 has a structure comprising longitudinal bulkheads 80 that divide the hull into three tank compartments: a port side tank P, a central tank C and a starboard tank S. The ship's structure further comprises transverse bulkheads 82 that are illustrated in FIG. 5.

FIG. 11 shows, in top view, part of the tank structure of the oil tanker 2 prior to conversion. In particular, the structure of a central tank C is illustrated. FIG. 11 shows the longitudinal bulkheads 80 and transverse bulkheads 82. In this embodiment, the transverse bulkheads 82 are corrugated bulkheads. The longitudinal bulkheads 80 comprise horizontal stiffening ribs 84 and vertically extending web frames 86.

Pre-conversion, the longitudinal bulkheads 80 are provided with stringers 88 that extend horizontally along the longitudinal bulkheads 80 and also mutually connect the longitudinal bulkheads 80. The stringers are provided at regular height intervals. In this embodiment, the height between stringers 88 is 4 meters.

FIG. 12 shows the tank structure of FIG. 11 after conversion. FIG. 12 is a detailed view intended as an example of any one of the inner decks 32, 34, 36 after conversion. For ease of reference herein, FIG. 12 denotes the exemplary inner deck shown as inner deck 90, because all inner decks 32, 34, 36 of this embodiment are constructed in a similar way. The inner deck 90 is mounted to the stringers 88. In addition, an opening 92 is created in the longitudinal bulkheads 80, specifically in a lower part thereof, to allow personnel to move between the port P, central C and starboard S sections of the tank structure, which makes all production lanes on the same floor accessible (see also FIG. 6, wherein openings 92 are also indicated).

Figures 13, 14:
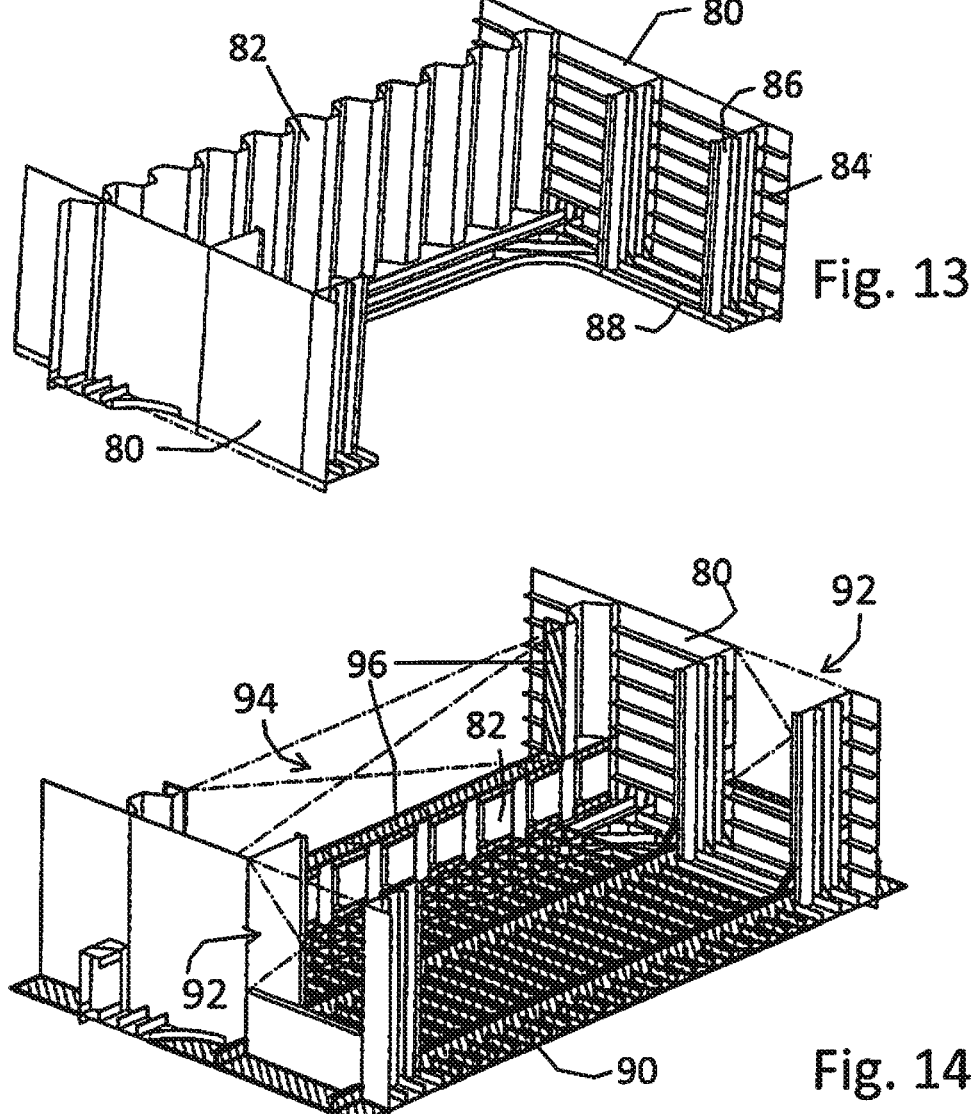
FIG. 13 shows the tank structure of FIG. 11 (pre-conversion) in bottom view.
FIG. 14 shows the tank structure of FIG. 13 (after conversion) in bottom view.

FIG. 13 shows, in a bottom view, the tank structure of the oil tanker prior to conversion, while FIG. 14 shows the situation after conversion. In particular, FIG. 14 shows that, during conversion, openings 94 are created in transverse bulkheads 82. FIG. 14 shows one such opening 94, in FIG. 5 multiple openings 94 are indicated). Stiffening members 96 are provided along the edges of openings 94, to ensure sufficient stiffness of the tank structure.

Variants of the shown embodiments of the device and method are well possible within the scope of the attached claims. It is possible to combine one or more features of one embodiment with one or more features of another embodiment. The features of the above-described embodiments may be replaced by any other feature within the scope of the attached claims, such as the features described in the following paragraphs.

The example of the figures shows that the ship accommodates 44 apparatuses for producing an elongated tension member. However, any suitable number of apparatuses can be provided, in particular a smaller number. In a currently preferred embodiment, three to five apparatuses are provided per floor. It is not necessary to provide each floor with such an apparatus, some floors may be used for different purposes. In an alternative embodiment, at least one apparatus is provided on an upper deck.

In one embodiment, the factory comprises twelve apparatuses for producing an elongated tension member. For example, the factory comprises a ship with four floors, each equipped with three apparatuses.

In the example, the figures show that three inner decks are mounted in the hull of the ship to provide four production floors. However, any suitable number of inner decks may be provided. For example, one or two inner decks are present in an existing ship, or mounted in an oil carrier, to create two or three floors.

More than one braiding machine can be provided per floor.

The figures show endless winding apparatuses of different length. Alternatively, apparatuses having the same length can be provided.

In an embodiment, one or more reels for holding finalized tension members have a diameter of more than four meters, e.g. five or six meters. In an embodiment, the thimble holder of the endless winding apparatus is connected to the elongated guide of the apparatus. In another embodiment, the thimble holder of the endless winding apparatus is connected to an inner deck of the buoyant body (e.g. ship).

In an embodiment, a battery for storing electrical energy (e.g. generated by solar panels and/or wind turbines) is located in the empty engine room.

In an embodiment, a hydrogen production facility, hydrogen storage and/or a hydrogen fuel cell is located in the empty engine room. In an alternative embodiment, the hydrogen storage is provided in an existing tank space, such as the fuel or diesel tank or ballast tank, of the (converted) vessel.

Preferably, at least one of the apparatuses for producing the elongated tension member is suitable for producing tension members of different lengths. For example, in case of an endless winding machine described above, the distance between the two thimble holders may be adjustable to set the desired length for the tension member.

The invention claimed is:

1. A factory for producing at least one elongated tension member, the factory comprising:
at least one apparatus for producing the at least one elongated tension member, the at least one apparatus comprising:
a feeder arranged to provide input material, the input material comprising:
at least one load bearing yarn, and/or
at least one load bearing wire, and/or
load bearing fibers;
a processing device arranged to wind and/or twist and/or bundle the input material provided by the feeder; and
at least one end fitting device arranged to provide the at least one elongated tension member with a proximal end fitting and a distal end fitting; and
a ship comprising a hull and an upper deck, said ship arranged to support the at least one apparatus for producing the at least one elongated tension member; and
at least one inner deck mounted in the hull, below the upper deck, to provide multiple production compartments, wherein each of respective apparatus for producing the at least one elongated tension member is provided in one respective production compartment.

2. The factory according to claim 1, wherein:
the input material comprises the at least one load bearing yarn;
the processing device is arranged to wind the at least one load bearing yarn around two thimbles that are provided at opposite ends of the at least one elongated tension member from a first one of the two thimbles to a second one of the two thimbles, back to the first one of the two thimbles, which winding is repeated until sufficient windings extend between the two thimbles;
the proximal and distal end fittings of the at least one elongated tension member comprise the two thimbles; and
the at least one end fitting device comprises a first thimble holder and a second thimble holder that are provided at a distance from one another, and are each designed to hold one of the two thimbles.

3. The factory according to claim 2, wherein the processing device comprises an elongated guide and a carriage, wherein:
the feeder is connected to the carriage;
the elongated guide and the carriage are movably connected to one another for a movement of the carriage relative to the elongated guide in a length direction of the elongated guide;
the feeder comprises at least one spool holder for holding a spool with the at least one load bearing yarn, and an output guide for guiding the at least one load bearing yarn to the at least one elongated tension member during winding; and
the output guide and the first thimble holder, as well as the output guide and the second thimble holder, are movable relative to each other in at least a direction perpendicular to the length direction of the elongated guide for guiding the at least one load bearing yarn half a turn around respectively the first one of the two thimbles and the second one of the two thimbles during winding.

4. The factory according to claim 1, wherein the at least one elongated tension member comprises rope, the input material comprises the load bearing fibers or the at least one load bearing wire, wherein the at least one load bearing wire is a plurality of metal wires, and the processing device is arranged to twist or braid the load bearing fibers or the metal wires.

5. The factory according to claim 1, further comprising a reel on the upper deck configured for winding the at least one elongated tension member onto the reel, and wherein the upper deck comprises a hatch for feeding the at least one elongated tension member, produced by the at least one apparatus within the hull, to the reel on the upper deck.

6. The factory according to claim 1, wherein the hull comprises a double hull that is at least partly filled with ballast comprising a solid material, a flowable material and/or fresh water.

7. The factory according to claim 6, wherein the ballast comprises the flowable material selected from the group consisting of: sand, concrete, and rock.

8. The factory according to claim 1, wherein the ship is a converted motorized ship, wherein an engine of the motorized ship is removed from an engine room of the ship for repurposing the engine room as storage room for storing the input material.

9. The factory according to claim 1, wherein the ship is a converted oil tanker, wherein the hull comprises a tank structure, and wherein the at least one inner deck is mounted in the tank structure to provide the multiple production compartments.

10. The factory according to claim 9, wherein the tank structure comprises stringers and the at least one inner deck is mounted to said stringers.

11. The factory according to claim 1, wherein the at least one apparatus comprises multiple apparatuses, and the at least one inner deck is provided with the multiple apparatuses, the multiple apparatuses being arranged parallel to each other to form parallel production lanes for producing at least a first and second elongated tension member of the at least one elongated tension member with the multiple apparatuses.

12. The factory according to claim 11, wherein the at least one inner deck is further provided with a braiding machine for braiding a protective cover around the first elongated tension member, and wherein the braiding machine is movable between at least two production lanes.

13. The factory according to claim 1, wherein the ship is provided with solar panels and/or wind turbines.

14. The factory according to claim 13, wherein the wind turbines are vertical axis wind turbines.

15. The factory according to claim 13, further comprising a hydrogen production facility and/or hydrogen storage and/or a hydrogen fuel cell.

16. A method for constructing a factory for producing one or more elongated tension members, the method comprising:

providing at least one apparatus for producing the one or more elongated tension members, each apparatus comprising:

a feeder arranged to provide input material, the input material comprising:

at least one load bearing yarn, and/or at least one load bearing wire, and/or
load bearing fibers;

a processing device arranged to wind and/or twist and/or bundle the input material provided by the feeder; and one or more end fitting device arranged to provide the at least one elongated tension members with a proximal end fitting and a distal end fitting;

converting a ship comprising a hull and an upper deck;

mounting at least one inner deck in the hull, below the upper deck, to provide multiple production compartments in the ship; and installing each respective apparatus for producing the one or more elongated tension members in one respective production compartment.

17. The method according to claim 16, wherein the ship is an oil tanker, and wherein the converting of the ship comprises: mounting the at least one inner deck in the hull of the ship for supporting the at least one apparatus for producing one or more elongated tension members, wherein the at least one inner deck is mounted to stringers of a tank structure of the ship.

* * * * *